United States Patent [19]

Ikeyama et al.

[11] Patent Number: 6,063,536
[45] Date of Patent: May 16, 2000

[54] THERMAL FIXING DEVELOPER MATERIAL AND WAX FOR ELECTROPHOTOGRAPHY

[75] Inventors: Seiichi Ikeyama; Hideki Sakai, both of Kuga-gun, Japan

[73] Assignee: Mitsui Petrochemical Industries Ltd., Tokyo, Japan

[21] Appl. No.: 08/868,072

[22] Filed: Jun. 3, 1997

[30] Foreign Application Priority Data

Jun. 4, 1996 [JP] Japan ................................... 8-141377

[51] Int. Cl.⁷ ............................. G03G 13/20; G03G 9/08
[52] U.S. Cl. .............................. 430/110; 430/99; 526/125
[58] Field of Search .................................... 430/106, 109, 430/110; 526/125, 126

[56] References Cited

U.S. PATENT DOCUMENTS

| | | | |
|---|---|---|---|
| 4,418,184 | 11/1983 | Ueda et al. | 526/125 |
| 4,917,982 | 4/1990 | Tomono et al. | 430/99 |
| 4,921,771 | 5/1990 | Tomono et al. | . |
| 4,988,598 | 1/1991 | Tomono et al. | . |
| 4,997,739 | 3/1991 | Tomono et al. | . |
| 5,004,666 | 4/1991 | Tomono et al. | . |
| 5,023,158 | 6/1991 | Tomono et al. | . |
| 5,086,134 | 2/1992 | Antberg et al. | 526/126 |
| 5,330,568 | 7/1994 | Park et al. | 106/270 |
| 5,629,118 | 5/1997 | Tomono et al. | . |
| 5,629,123 | 5/1997 | Tomono et al. | . |

FOREIGN PATENT DOCUMENTS

| | | |
|---|---|---|
| 2352604 | 5/1974 | Germany . |
| 57-52574 | 11/1982 | Japan . |
| 58-59455 | 4/1983 | Japan . |
| 58-58664 | 12/1983 | Japan . |
| 1442835 | 7/1976 | United Kingdom . |
| WO93/16416 | 8/1993 | WIPO . |

*Primary Examiner*—John Goodrow
*Attorney, Agent, or Firm*—Sherman & Shalloway

[57] ABSTRACT

A thermal fixing developer material for electrophotography is provided. This developer material is adapted for use as a main component of an electrostatic toner, and the toner produced by using this developer material exhibits excellent release properties upon thermal fixing, and in particular, upon thermal fixing at low temperature, and therefore, is free from offset and contamination of carrier, photosensitive material, heat roller, and the like. Such a toner is also provided with high blocking resistance. The developer material of this invention comprises a wax of a propylene-based copolymer having a particular molecular weight, a particular melting point, and a particular compositional distribution.

3 Claims, No Drawings

THERMAL FIXING DEVELOPER MATERIAL AND WAX FOR ELECTROPHOTOGRAPHY

BACKGROUND OF THE INVENTION

This invention relates to a thermal fixing developer material for electrophotography, and more specifically, to a thermal fixing developer material for electrophotography which is adapted for use as a main component of an electrostatic toner. The toner produced by using the developer material of the present invention exhibits excellent release properties upon thermal fixing, and therefore, is free from offset and contamination of carrier, photosensitive material, heat roller, and the like. The toner produced by using the developer material of the present invention also exhibits high blocking resistance.

In electrophotography, an electrostatic toner, which is a developer material for electrophotography, is used for developing a visible image from a latent image which has been created by application of a charge pattern on the surface of a photoreceptor. An electrostatic toner is a finely divided chargeable powder which may comprise a resin having dispersed therein a coloring agent such as carbon black and a pigment or the like. Electrostatic toners may be categorized into dry two-component toners which are used with a carrier such as iron powder or glass particles; wet toners which comprise a dispersion system in an organic solvent such as isoparaffin; and dry one-component toners having a magnetic finely divided powder dispersed therein.

The image which has been developed on the photoreceptor with the electrostatic toner is transferred onto a paper from the photo receptor, and on the paper, the image is fixed by means of heat or a vaporized solvent. In the case of an image which has been directly developed on a paper having disposed thereon a sensitizing layer, the image is fixed by means of heat or a vaporized solvent with no further transfer. Among various methods of fixing, fixing of an image using a heating roller is an advantageous method since it is a contact fusing at a high thermal efficiency which may enable a reliable fixing of the image even when a heat source at a relatively low temperature is used, and since such method is adequate for a high-speed reprography.

However, when a conventional electrostatic toner is used and the image is fixed onto a paper by bringing a heated body such as a heating roller in contact with the image, a phenomenon called offset is likely to be induced. In particular, in a high-speed reprography wherein the temperature of the heated body must be elevated to increase fixing efficiency and fixing rate, such offset phenomenon is more likely to be induced. In view of such situation, in the case of fixing an image created by one-component electrostatic toner using a heating roller, the roller surface is often impregnated with or fed with a silicone oil to thereby avoid such an offset phenomenon from being induced. Such countermeasure, however, may induce another problem that the roller may become susceptible for contamination.

In order to avoid the offset phenomenon, WO 93/16416 discloses an electrostatic toner comprising a wax wherein fixing of the image formed by the toner to the paper, namely, the strength of the fixed image is improved by using high molecular weight components, while suppressing the excessive increase in the softening point and the resulting poor low-temperature fixing induced by such use of the high molecular weight components. More illustratively, the increase in the softening point is suppressed by using a wax having a relatively high XR of from 1.80 to 2.50, namely, a relatively high content of comonomer-rich, low-melting components. The increase in the softening point is thus suppressed to thereby provide a wax of a high molecular weight having a relatively low softening point. In spite of the relatively good image fixing, temperature of low-temperature offset disappearance is rather high in such a toner due to the relatively high melting point and softening point. In addition, the high XR of from 1.80 to 2.50, namely, the relatively high content of α-olefin (comonomer) components in the low molecular weight range results in the inferior blocking resistance of the toner since the comonomer components act as sticky components.

For a binder which is one of the main component in the electrostatic toner, various thermoplastic resins have been employed. Among such thermoplastic resins which have been employed for the binder, low-molecular weight styrene-(meth)acrylate copolymers have the merits that they are highly chargeable; that they exhibit an excellent fixing owing to their adequate softening point(approx. 100° C.); that cleaning of the photoreceptor is easy and the photoreceptor is less susceptible to contamination; that they are less hygroscopic; that they may be sufficiently mixed with carbon black which is the colorant; and that they may be readily pulverized. However, such conventional electrostatic toners prepared by using a low-molecular weight styrene-(meth) acrylate copolymer may still suffer from the offset phenomenon when they are used in the high-speed reprography.

In order to obviate the above-described problems, inclusion in the electrostatic toner of a polyolefin wax as a releasing agent has been proposed (JP-B-52-3304; JP-B-52-3305; JP-B-57-52574; JP-B-58-58664; JP-A-58-59455).

When the techniques described in the above-mentioned JP-B-52-3304 and the like are used, various problems other than the offset phenomenon are simultaneously induced. The toner having the polyolefin wax added thereto suffer from low blocking resistance, and such toner undergoes blocking in the toner cartridge, and in such a case, no toner would be fed to the photoreceptor. A filming phenomenon, that is, deposition of low crystalline substances of the wax on the carrier, photoreceptor, heating roller and the like, is also induced to adversely affect the formation of the electrostatic latent image or the electric charge of the toner to result in the disturbed image.

SUMMARY OF THE INVENTION

In view of the above-described situation, an object of the present invention is to provide a thermal fixing developer for electrophotography which, when used as a main component in an electrostatic toner, is capable of providing a reprographic image which exhibits good release properties upon thermal fixing, in particular, good release properties upon low-temperature fixing; an excellent blocking resistance; no offset; and no contamination of the carrier, the photoreceptor, the heating roller, and the like.

The inventors of the present invention have made an intensive study in order to obviate the above-described problems, and found out that the above-described problems may be obviated by using a propylene-based copolymer wax having a particular molecular weight, a particular melting point, and a particular compositional distribution. The present invention has been completed on the bases of such finding.

According to the present invention, there is provided a thermal fixing developer material for electrophotography comprising (A) a wax of a propylene-based copolymer
wherein said propylene-based copolymer has
  a weight average molecular weight (Mw) determined by gel permeation chromatography (GPC) of from 3,000 to 50,000, and
  a melting point determined by differential scanning calorimeter (DSC) of from 120° C. to 140° C., and
wherein said propylene-based copolymer has
  a compositional distribution CMn/CMw determined by gel permeation chromatography-Fourier transform infrared spectroscopy (GPC-FTIR) of from 1.0 to 2.0, or/and
  an average ethylene content of lower molecular weight portion (XL) and average ethylene content of the residual higher molecular weight portion (XH) determined by the GPC-FTIR at a ratio (XR=XL/XH) of from 1.0 to 1.5;
  said CMn being ethylene content in % by mole at the number average molecular weight determined by the GPC-FTIR, and CMw being ethylene content in % by mole at the weight average molecular weight determined by the GPC-FTIR.;
(B) a binder; and
(C) a colorant.

According to the present invention, there is also provided a propylene-based copolymer wax (A) adapted for use as a component of a thermal fixing developer material for electrophotography

DETAILED DESCRIPTION OF THE INVENTION

Next, the thermal fixing developer material for electrophotography of the present invention (hereinafter referred to as the developer material of the invention) is described in detail.

The propylene-based copolymer wax (A) of the present invention may typically comprise a propylene-ethylene copolymer or a propylene-ethylene-$C_{4-12}$ $\alpha$-olefin copolymer.

The $\alpha$-olefin containing 4 or more carbon atoms may preferably be a $C_{4-12}$ $\alpha$-olefin. Typical $C_{4-12}$ $\alpha$-olefins include butene-1, pentene-1, 2-methylbutene-1, 3-methylbutene-1, hexene-1, 3-methylpentene-1, 4-methylpentene-1, 3,3-dimethylbutene-1, heptene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentene-1, decene-1, methylnonene-1, dimethyloctene-1, trimethylheptene-1, ethyloctene-1, methylethylheptene-1, diethylhexene-1, dodecene-1, hexadodecene-1, and the like.

The propylene-based copolymer wax (A) is most preferably a propylene-ethylene copolymer or a propylene-ethylene-butene copolymer.

The propylene content is generally more than 90% by mole, and preferably, in the range of from 91 to 97% by mole.

The propylene-based copolymer wax (A) of the present invention has a weight average molecular weight (Mw) determined by gel permeation chromatography (GPC) of from 3000 to 50000, and preferably from 5000 to 40000.

In view of the low temperature fixing and the flowability of the toner, the propylene-based copolymer wax (A) may have either a compositional distribution CMn/CMw determined by GPC-FTIR of from 1.0 to 2.0, and preferably, from 1.0 to 1.8, or a ratio (XR=XL/XH) of average ethylene content of lower molecular weight portion (XL) to average ethylene content of the residual higher molecular weight portion (XH) of from 1.0 to 1.5, and preferably, from 1.0 to 1.4.

The compositional distribution CMn/CMw is determined by fractionating the sample according to the molecular weight by high temperature gel permeation chromatography (GPC), continuously passing the fractionated sample of respective molecular weight through the flow cell, and continuously measuring the ethylene content (% by mole) of the fractionated sample by Fourier transform infrared spectroscopy (FTIR). The GPC chromatogram obtained in the measurement was used to determine the average ethylene content (CMn) (the point in the GPC chromatogram corresponding to the number average molecular weight) and the average ethylene content (CMw) (the point in the GPC chromatogram corresponding to the weight average molecular weight), and to thereby calculate the compositional distribution in terms of the ratio CMn/CMw.

XR (XR=XL/XH) is the ratio of the average ethylene content of the lower-molecular weight portion (XL) and the average ethylene content of the higher-molecular weight portion (XH) On the bases of the results of the GPC molecular weight fractionation, the lower-molecular weight portion of the sample occupying 30% of the total area of the chromatogram is designated the lower-molecular weight portion, and the residual higher-molecular weight portion of the sample occupying the residual 70% of the total area of the chromatogram is designated the higher-molecular weight portion, and the average ethylene content of the lower-molecular weight portion (XL) and the average ethylene content of the higher-molecular weight portion (XH) is determined to calculate the ratio XR of XL/XH.

There is no constant relation between the CMn/CMw and the XL/XH. However, in the case of the propylene-based copolymer of the present invention, there is relation: CMn/CMw×0.5+0.5≈XL/XH. Therefore, CMn/CMw in the range of from 1.0 to 2.0 corresponds to XL/XH in the range of from 1.0 to 1.5.

The density of the propylene-based copolymer wax determined according to JIS K6760 is preferably from 0.88 to 0.92, and the softening point determined according to JIS K2207 is preferably from 125 to 160° C.

The propylene-based copolymer wax as described above may be used either alone or in combination of two or more.

The propylene-based copolymer wax (A) of the present invention may be prepared either by copolymerizing a propylene-ethylene copolymer or a copolymer of propylene, ethylene, and a $C_{4-12}$ $\alpha$-olefin, or by thermal decomposition of a high molecular weight propylene-based copolymer. The production by thermal decomposition is preferable in view of the high yield and high efficiency.

The copolymerization of a propylene-ethylene copolymer or a copolymer of propylene, ethylene, and a $C_{4-12}$ $\alpha$-olefin may be conducted by a known process, for example, intermediate or low pressure polymerization in the presence of a transition metal compound catalyst such as a Ziegler catalyst or metallocene catalyst.

The thermal decomposition of the high molecular weight propylene-based copolymer may be typically conducted by decomposing the high molecular weight propylene-based copolymer with heat, for example, at a temperature of from 300 to 460° C., and preferably, from 350 to 450° C.

The apparatus used for the thermal decomposition is not limited to any particular type. Typical apparatus include reactors of tubular and tank types as well as single- and twin-screw extruders. Use of a tubular reactor is preferable in view of the ease of high temperature heating.

Exemplary high molecular weight propylene-based copolymers adapted for such thermal decomposition include propylene-ethylene copolymers and propylene-ethylene-$C_{4-12}$ α-olefin copolymers.

The binder component (B) used for the thermal fixing developer material for electrophotography in accordance with the present invention is not limited to any particular type so long as it comprises a thermoplastic resin which can be admixed with such a developer material. The binder may comprise, for example, a styrene polymer, a ketone resin, maleic acid resin, an aliphatic polyester resin, an aromatic polyester resin, a coumaron resin, a phenol resin, an epoxy resin, a terpene resin, a polyvinyl butyral, a polybutyl methacrylate, a polyvinyl chloride, a polyethylene, a polypropylene, a polybutadiene, and an ethylene-vinyl acetate copolymer. Among these, the preferred is the styrenic polymer, which has an adequate softening point (in the vicinity of 100° C. ) as well as good fixing properties.

The styrene polymer may typically be a polymer solely comprising a styrene monomer or a copolymer of a styrene monomer with other vinyl monomer. Exemplary styrene monomers include styrene, p-chlorostyrene, and vinyl naphthalene. Exemplary of such other vinyl monomers include ethylenic unsaturated monoolefins such as ethylene, propylene, 1-butene, isobutene, etc.; halogenated vinyls such as vinyl chloride, vinyl bromide, vinyl fluoride, etc.; vinyl esters such as vinyl acetate, vinyl propionate, vinyl benzoate, etc., α-methylene aliphatic monocarboxylates such as methyl acrylate, ethyl acrylate, n-butyl acrylate, isobutyl acrylate, n-octyl acrylate, dodecyl acrylate, 2-chloro-ethyl acrylate, phenyl acrylate, methyl α-chloroacrylate, methyl methacrylate, ethyl methacrylate, butyl methacrylate, etc.; nitriles and amides such as acrylonitrile, methacrylonitrile, acrylamide, etc.; vinyl ethers such as vinyl methyl ether, vinyl ethyl ether, vinyl propyl ether, vinyl isobutyl ether, etc.; vinyl ketones such as vinyl methyl ketone, vinyl hexyl ketone, methyl isopropenyl ketone, etc.; and N-vinyl compounds such as N-vinyl pyrrole, N-vinyl carbazole, N-vinyl indol, N-vinyl pyrrolidone, etc. Among such styrene polymers, the preferred are those having a number average molecular weight (Mn) of at least 2,000, and most preferred are those having a number average molecular weight (Mn) in the range of from 3,000 to 30,000. Furthermore, the styrene polymer may preferably be those having a styrene content of at least 25% by weight.

The colorant component (C) used for the developer material in accordance with the present invention is not limited to any particular type so long as it may be admixed with the developer material. Exemplary colorants are such pigments and dyes as carbon black, phthalocyanine blue, aniline blue, arcooil blue, chrome yellow, ultramarine blue, quinoline yellow, lamp black, rose Bengal, diazo yellow, rhodamine B lake, carmine 6B, and quinacridone derivatives, which may be used either alone or in combination of two or more.

The colorant (C) may have admixed therewith an oil-soluble dye such as an azine Nigrosine, Induline, an azo dye, an anthraquinone dye, a triphenyl methane dye, a xanthene dye, or a phthalocyanine dye.

In preparing the developer material of the present invention, the above-described propylene-based copolymer wax (A), the binder (B), and the colorant (C) may be blended at a propylene-based copolymer wax (A)/binder (B)/colorant (C) weight ratio of about 1 to 20/100/1 to 20, and preferably at about 1 to 10/100/1 to 10.

The developer material of the present invention may have blended therewith components other than the above-described propylene-based copolymer wax (A), the binder (B), and the colorant (C) in an amount that would not adversely affect the merits of the present invention. Exemplary such additional components are charge controlling agent and plasticizer.

The developer material of the present invention may be used as a main component for either a two-component electrostatic toner or a one-component electrostatic toner. When the developer material of the present invention is used as a main component for the two-component electrostatic toner, the two-component electrostatic toner may be prepared by mixing the above-described propylene-α-olefin copolymer wax (A), the binder (B), the colorant (C), and other optional components by a known method in a ball mill, an attritor or the like; subsequently kneading the mixture with a heated twin roll, a heated kneader, an extruder, or the Like; cooling the kneaded product to allow for solidification to take place; granulating the thus solidified product in a hammer mill or a crusher; finely dividing the product in a jet mill or a vibration mill, or in a ball mill or an attritor after admixing water with the product; classifying the particles to adjust their average particle size to the range of from 5 to 35 μm; and adding a carrier to the particles to thereby prepare the two-component electrostatic toner. The carrier employed may be a known carrier, and the carrier is not limited to any particular type. Exemplary carriers which may be employed include silica sand having a particle size in the range of from 200 to 700 μm, glass beads, iron spheres, magnetic powder material consisting of iron, nickel or cobalt magnetic.

In such a two-component electrostatic toner, the propylene-α-olefin copolymer wax (A) is blended in an amount of from 1 to 20 parts by weight, and preferably, in an amount of from 2 to 10 parts by weight per 100 parts by weight of the thermoplastic resin including the binder (B).

When the developer material of the present invention is used as a main component for the one-component toner, the one-component electrostatic toner may be prepared by processing the propylene-α-olefin copolymer wax (A), the binder (B), the colorant (C), other optional additives and thermoplastic resin, and magnetic powder material by the same procedure as the preparation of the two-component toner.

In such a one-component electrostatic toner, the propylene-α-olefin copolymer wax (A) is used in an amount of from 1 to 20 parts by weight, and preferably, in an amount of from 1 to 10 parts by weight per 100 parts by weight of the binder (B).

The magnetic powder blended in the one-component electrostatic toner may typically be a finely divided magnetite powder having a particle size of up to 1 μm. However, metals such as cobalt, iron and nickel, alloys and oxides thereof, ferrite, and a mixture thereof in powder form may also be used. The magnetic powder material may be generally blended in the one-component electrostatic toner in an amount of from 40 to 120 parts by weight per 100 parts by weight of the total of the binder (B) and the magnetic powder material. When the magnetic powder material is blended in the toner in such an amount, the resulting toner may have a good charge retaining properties with no reduction in the electric resistance, as well as a softening point in an adequate range, and consequently, the toner will be adequately fixed to produce a clear image with no blur. The toner having the magnetic powder material blended in such an amount also has the required electrostatic value as well as a sufficient resistance to flying. If desired, a known charge control agent may be blended in the above-described two-component or one-component electrostatic toners.

Next, the present invention is described in further detail by referring to Examples of the invention and Comparative Examples, which by no means limit the scope of the invention.

EXAMPLES

Example 1

Production of Propylene-Based Copolymer Wax

A high-molecular weight propylene-ethylene-butene copolymer (a propylene-ethylene-butene copolymer copolymerized from monomers of propylene, ethylene and butene in the presence of a solid titanium catalyst comprising magnesium chloride having titanium and an electron donor loaded thereon; melt index, 5; propylene content, 93% by mole; melting point, 130° C.; CMn/CMw=1.40; hereinafter abbreviated as PO-1) was fed to a twin screw extruder (screw diameter: 30 mm), and extruded at screw rotation rate of 25 rpm to thermally degrade the copolymer at 400° C. The propylene-ethylene-butene copolymer wax was thereby produced (The wax is hereinafter abbreviated as PW-1).

The resulting propylene-ethylene-butene copolymer wax had the properties as shown in Table 1.

The weight average molecular weight, the melting point, and the compositional distribution (CMn/CMw), and XR=XL/XH were measured as described below.

Weight Average Molecular Weight

A sample at a concentration of 0.1% by weight was prepared by using o-dichlorobenzene for the solvent. GPC150C manufactured by Waters Inc. was used at 140° C. at a flow rate of 1.0 ml/min. The molecular weight was calculated by referring to the calibration curve depicted by using monodisperse polystyrene standard samples. The column used was GMH-HT (60 cm) connected to GMH-HTL (60 cm), both being the products of ToSo K.K.

Melting Point

A differential scanning calorimeter (DSC) was used for the measurement. The sample was heated to 200° C., retained at this temperature for 10 minutes, cooled to 30° C. at a rate of 10° C./min, and retained at this temperature for 5 minutes. The sample was then heated at a temperature increase rate of 10° C./min and the endothermic peak observed was taken as the melting point.

Compositional Distribution (CMn/CMw)

A sample at a concentration of 0.1% by weight was prepared by using o-dichlorobenzene for the solvent. The GPC system used included oven of the temperature elevation elusion/fractionation system manufactured by ToSo K.K., and the column of GMH-HT (60 cm) manufactured by ToSo K.K. The sample was fractionated by molecular weight under the conditions of a temperature of 140° C. and a flow rate of 1.0 ml/min. The sample fraction of the respective molecular weight was continuously passed through the flow cell, and ethylene content (% by mole) was continuously measured by Fourier transform infrared spectroscopy (FTIR). The ethylene content was determined from the profile of the peak appearing at the infrared absorption wave length of from 3400 to 2500 $cm^{-1}$.

The resulting GPC chromatogram was used to determine the ethylene content at the point corresponding to the number average molecular weight (Mn), namely, the average ethylene content (CMn), and the ethylene content at the point corresponding to the weight average molecular weight (Mw), namely, the average ethylene content (CMw); and to determine the ratio CMn/CMw. The calibration curve depicted using monodisperse polystyrene standard samples was used for calculating the molecular weight.

XR=XL/XH

On the bases of the results of the molecular weight fractionation obtained in the CMn/CMw determination, the lower-molecular weight portion of the sample occupying 30% of the total area of the chromatogram was designated the lower-molecular weight portion, and the residual higher-molecular weight portion of the sample occupying the residual 70% of the total area of the chromatogram was designated the higher-molecular weight portion. The average ethylene content (XL) of the lower-molecular weight portion and the average ethylene content (XH) of the higher-molecular weight portion was determined to calculate the ratio XR of KL/XH.

Preparation of Two-Component Electrostatic Toner

To a ball mill were fed 85 parts by weight of styrene-n-butyl methacrylate copolymer (Hymer SEM-73F, manufactured by Sanyo Chemical Industries, Ltd.), 4 parts by weight of PW-1, 9 parts by weight of carbon black (DiaBlack SH, manufactured by Mitsubishi Chemical Industries, Ltd.), and 2 parts by weight of a metal complex dye (Zapon-Fastblack B, manufactured by BASF Inc.), and the mixture was milled in the ball mill for 24 hours. The mixture was then kneaded with heated rolls, cooled, finely divided, and classified to produce a developer material having an average particle size in the range of from 13 to 15 $\mu$m.

A two-component electrostatic toner was prepared by mixing 120 parts by weight of the developer material with 100 parts by weight of iron powder carrier having an average particle size in the range of from 50 to 80 $\mu$m. The thus produced two-component electrostatic toner was evaluated for its reprographic properties by the following procedures.

The results are shown in Table 2.

Fixing of Fixed Image

A test image was electrophotographically duplicated on a selenium photoreceptor and the duplicated image was developed by using the two-component electrostatic toner, and the developed image was transferred onto a receiving sheet of paper. The thus transferred image was fixed by using a fixing roller having a surface formed of polytetrafluoroethylene (manufactured by DuPont Inc.) heated to a temperature of 200° C. backed with a pressure roller having a surface formed of a silicone rubber (KE-1300RTV, manufactured by Shinetsu Chemical K.K.). The resulting fixed image was rubbed on its surface for five times with a sand-mixed rubber eraser having a bottom face of 15 mm×7.5 mm, on which a load of 500 grams was placed. Optical reflection density (image density) was measured with reflection densitometer (manufactured by Macbeth Inc.) before and after the rubbing of the fixed image with the eraser, and the fixing of the fixed image was determined by the following equation:

$$\text{Fixing} (\%) = \frac{\text{(Image density after the rubbing)}}{\text{(Image density before the rubbing)}} \times 100$$

Blocking Resistance of the Toner

A 100 g portion of the two-component toner produced was placed in a plastic bottle. After tapping, the bottle was left to stand at 60° C. for 50 hours, and then cooled to room temperature to evaluate the degree of blocking. The degree of blocking was determined by visual inspection according to the following criteria:

⊚: no blocking at all,

O: slight blocking with a small number of masses which can be broken up by hand, Δ: considerable blocking with a considerable number of masses which can be broken up by hand, and X: heavy blocking with many lumps which can not be completely broken up by hand.

Temperature of low-temperature offset disappearance

A test image was electrophotographically duplicated on a selenium photoreceptor and the duplicated image was developed by using the two-component electrostatic toner, and the developed image was transferred onto a receiving sheet of paper. The thus transferred image was fixed by using a fixing roller having a surface formed of polytetrafluoroethylene (manufactured by DuPont Inc.) heated to various temperatures backed with a pressure roller having a surface formed of a silicone rubber (KE-1300RTV, manufactured by Shinetsu Chemical K.K.). Next, a receiving sheet of paper with no fixed image was pressed to the fixing roller under the above-described conditions to evaluate for the offset. The temperature at which the offset phenomenon disappeared was designated the temperature of low-temperature offset disappearance.

Offset, Image Disturbance, and Contamination of Photoreceptor and Heating roller A test image was electrophotographically duplicated on a selenium photoreceptor and the duplicated image was developed by using the two-component electrostatic toner, and the developed image was transferred onto a receiving sheet of paper. The thus transferred image was fixed by using a fixing roller having a surface formed of polytetrafluoroethylene (manufactured by DuPont Inc.) heated to a temperature of 200° C. backed with a pressure roller having a surface formed of a silicone rubber (KE-1300RTV, manufactured by Shinetsu Chemical K.K.). After repeating the above-described reprographic procedure for 5,000 times, the paper was evaluated for the offset and image disturbance, and the photoreceptor and the fixing roller were evaluated for their surface contamination.

The offset and the image disturbance were evaluated by visual inspection in accordance with the following criteria:

O: no offset or image disturbance,

Δ: slight offset or image disturbance, and

X: severe offset or image disturbance.

The contamination of the photoreceptor and the fixing roller was evaluated by visual inspection in accordance with the following criteria.

⊚: no contamination,

O: very slight contamination, and

X: considerable contamination.

Example 2

The procedure of Example 1 was repeated except that the high molecular weight propylene-ethylene-butene copolymer (PO-1) was thermally degraded at 425° C. to prepare the propylene-ethylene copolymer wax, PW-2. The properties of the PW-2 are shown in Table 1.

Next, an electrostatic toner was prepared by repeating the procedure of Example 1 except that PW-2 was used instead of PW-1, and the resulting electrostatic toner was evaluated for its reprographic properties. The results are shown in Table 2.

Example 3

The procedure of Example 1 was repeated except that the high molecular weight propylene-ethylene-butene copolymer (PO-1) was thermally degraded at 390° C. to prepare the propylene-ethylene-butene copolymer wax, PW-3. The properties of the PW-3 are shown in Table 1.

Next, an electrostatic toner was prepared by repeating the procedure of Example 1 except that PW-3 was used instead of PW-1, and the resulting electrostatic toner was evaluated for its reprographic properties. The results are shown in Table 2.

Example 4

The procedure of Example 1 was repeated except that the high molecular weight propylene-ethylene-butene copolymer (PO-1) was replaced with a high molecular weight propylene-ethylene-butene copolymer (melt index, 20; melting point, 139° C.; CMn/CMw=1.47; hereinafter abbreviated as PO-2) to prepare the propylene wax, PW-4. The properties of the PW-4 are shown in Table 1.

Next, an electrostatic toner was prepared by repeating the procedure of Example 1 except that PW-4 was used instead of PW-1, and the resulting electrostatic toner was evaluated for its reprographic properties. The results are shown in Table 2.

Example 5

The procedure of Example 2 was repeated except that PO-1 was replaced with PO-2 to prepare the propylene wax, PW-5. The properties of the PW-5 are shown in Table 1.

Next, an electrostatic toner was prepared by repeating the procedure of Example 1 except that PW-5 was used instead of PW-1, and the resulting electrostatic toner was evaluated for its reprographic properties. The results are shown in Table 2.

Example 6

The procedure of Example 3 was repeated except that PO-1 was replaced with PO-2 to prepare the propylene wax, PW-6. The properties of the PW-6 are shown in Table 1.

Next, an electrostatic toner was prepared by repeating the procedure of Example 1 except that PW-6 was used instead of PW-1, and the resulting electrostatic toner was evaluated for its reprographic properties. The results are shown in Table 2.

Comparative Example 1

The procedure of Example 1 was repeated except that PO-1 was replaced with a propylene-ethylene-butene copolymer (melt index, 5; propylene content, 90%; melting point, 120° C.; CMn/CMw=2.20; hereinafter abbreviated as PO-3) to prepare the propylene-ethylene-butene wax, PW-7. The properties of the PW-7 are shown in Table 1.

Next, an electrostatic toner was prepared by repeating the procedure of Example 1 except that PW-7 was used instead of PW-1, and the resulting electrostatic toner was evaluated for its reprographic properties. The results are shown in Table 2.

Comparative Example 2

The procedure of Example 1 was repeated except that PO-1 was replaced with a propylene-ethylene copolymer (melt index, 20; propylene content, 93%; melting point, 125° C.; CMn/CMw=2.25; hereinafter abbreviated as PO-4) to prepare the propylene-ethylene wax, PW-8. The properties of the PW-8 are shown in Table 1.

Next, an electrostatic toner was prepared by repeating the procedure of Example 1 except that PW-8 was used instead of PW-1, and the resulting electrostatic toner was evaluated for its reprographic properties. The results are shown in Table 2.

Comparative Example 3

The procedure of Example 1 was repeated except that PO-1 was thermally degraded at 440° C. to prepare the propylene-ethylene-butene copolymer wax, PW-9. The properties of the PW-9 are shown in Table 1.

Next, an electrostatic toner was prepared by repeating the procedure of Example 1 except that PW-9 was used instead of PW-1, and the resulting electrostatic toner was evaluated for its reprographic properties. The results are shown in Table 2.

Comparative Example 4

The procedure of Example 1 was repeated except that PO-1 was thermally degraded at 370° C. to prepare the propylene-ethylene-butene copolymer wax, PW-10. The properties of the PW-10 are shown in Table 1.

Next, an electrostatic toner was prepared by repeating the procedure of Example 1 except that PW-10 was used instead of PW-1, and the resulting electrostatic toner was evaluated for its reprographic properties. The results are shown in Table 2.

Comparative Examples 5 to 10

In Comparative Examples 5 to 10, electrostatic toners corresponding to Examples 1 to 3 and Comparative Examples 1 to 3 of the above-mentioned WO 93/16416 were prepared. The resulting electrostatic toners were evaluated in accordance with the above-described criteria. The results are shown in Table 2.

TABLE 1

| | Wax type | Composition (molar ratio) | Weight average molecular weight | Mn (VPO) | Melting point (° C.) | Softening point (° C.) | CMn/CMw | $X_L/X_H$ |
|---|---|---|---|---|---|---|---|---|
| Ex. 1 | PW-1 | propylene/ethylene/butene = 93/5/2 | 25,000 | 9,600 | 128 | 137 | 1.40 | 1.24 |
| Ex. 2 | PW-2 | propylene/ethylene/butene = 93/5/2 | 8,000 | 2,800 | 123 | 129 | 1.35 | 1.20 |
| Ex. 3 | PW-3 | propylene/ethylene/butene = 93/5/2 | 45,000 | 17,500 | 128 | 139 | 1.43 | 1.24 |
| Ex. 4 | PW-4 | propylene/ethylene = 95/5 | 25,000 | 9,600 | 138 | 150 | 1.47 | 1.31 |
| Ex. 5 | PW-5 | propylene/ethylene = 95/5 | 8,000 | 2,800 | 132 | 142 | 1.53 | 1.36 |
| Ex. 6 | PW-6 | propylene/ethylene = 95/5 | 45,000 | 17,500 | 139 | 152 | 1.57 | 1.40 |
| Comp. Ex. 1 | PW-7 | propylene/ethylene/butene = 90/7/3 | 25,000 | 9,600 | 120 | 130 | 2.20 | 1.84 |
| Comp. Ex. 2 | PW-8 | propylene/ethylene = 92/7 | 25,000 | 9,600 | 125 | 135 | 2.30 | 2.04 |
| Comp. Ex. 3 | PW-9 | propylene/ethylene/butene = 93/5/2 | 1,000 | 300 | 115 | 125 | 1.40 | 1.24 |
| Comp. Ex. 4 | PW-10 | propylene/ethylene/butene = 93/5/2 | 80,000 | 36,000 | 129 | 139 | 1.45 | 1.29 |
| Comp. Ex. 5 | PW-1' | propylene/ethylene = 95/5 | 19,000 | 7,000 | 143 | 154 | 2.13 | 1.90 |
| Comp. Ex. 7 | PW-2' | propylene/ethylene = 95/5 | 22,000 | 8,000 | 143 | 154 | 2.18 | 1.94 |
| Comp. Ex. 8 | PW-3' | propylene/ethylene = 95/5 | 29,000 | 11,000 | 145 | 156 | 2.35 | 2.09 |
| Comp. Ex. 9 | PW-4' | propylene/ethylene = 95/5 | 11,000 | 4,000 | 140 | 152 | 1.89 | 1.68 |
| Comp. Ex. 9 | PW-5' | propylene/ethylene = 95/5 | 33,000 | 13,000 | 144 | 158 | 2.44 | 2.17 |
| Comp. Ex. 10 | PW-6' | propylene/ethylene = 95/5 | 21,000 | 8,000 | 143 | 156 | 1.69 | 1.50 |

TABLE 2

| | | Toner Properties | | | | | |
|---|---|---|---|---|---|---|---|
| | | Fixing of fixed image | Temp. of low-temp offset disappearance | Blocking resistance | Offset | Image Disturbance | Contamination of photoreceptor and roller |
| Ex. 1 | PW-1 | 90 | 134 | ⊚ | ◯ | ◯ | ⊚ |
| Ex. 2 | PW-2 | 88 | 129 | ◯ | ◯ | ◯ | ⊚ |
| Ex. 3 | PW-3 | 90 | 134 | ⊚ | ◯ | ◯ | ⊚ |
| Ex. 4 | PW-4 | 92 | 144 | ⊚ | ◯ | ◯ | ⊚ |
| Ex. 5 | PW-5 | 90 | 138 | ◯ | ◯ | ◯ | ⊚ |
| Ex. 6 | PW-6 | 92 | 145 | ⊚ | ◯ | ◯ | ⊚ |
| Comp. Ex. 1 | PW-7 | 90 | 126 | X | Δ | Δ | X |
| Comp. Ex. 2 | PW-8 | 88 | 131 | X | Δ | X | X |
| Comp. Ex. 3 | PW-9 | 86 | 121 | X | ◯ | X | X |
| Comp. Ex. 4 | PW-10 | 78 | 135 | ⊚ | X | ◯ | ⊚ |
| Comp. Ex. 5 | PW-1' | 89 | 149 | Δ | ◯ | ◯ | ⊚ |
| Comp. Ex. 6 | PW-2' | 91 | 149 | Δ | ◯ | ◯ | ⊚ |
| Comp. Ex. 7 | PW-3' | 94 | 151 | Δ | ◯ | ◯ | ⊚ |
| Comp. Ex. 8 | PW-4' | 77 | 148 | Δ | ◯ | X | ◯ |
| Comp. Ex. 9 | PW-5' | 94 | 156 | Δ | X | X | ◯ |
| Comp. Ex. 10 | PW-6' | 90 | 158 | X | X | X | X |

MERITS OF THE INVENTION

The thermal fixing developer material for electrophotography in accordance with the present invention is provided with good release properties upon low temperature thermal fixing as well as excellent blocking resistance. Furthermore, use of the developer material of the present invention would prevent the heated roll and the photoreceptor from undergoing a contamination. Therefore, the developer material of the present invention is quite preferable for the main component of an electrostatic toner.

We claim:

1. A thermal fixing developer material for electrography comprising (A) a propylene-based copolymer wax wherein said polyproplene-based copolymer has a weight average molecular weight ($M_w$) determined by gel permeation chromatography (GPC) of from 3,000 to 50,000, a melting point determined by differential scanning calorimer (DSC) of from 120° C. to 140° C., and a propylene content of at least 90% by mole of propylene, and wherein said propylene-based copolymer has a compositional distribution $CM_n/CM_w$ determined by gel permeation chromatography-Fourier transform infrared spectroscopy (GPC-FTIR) of from 1.0 to 2.0, $CM_n$ being the ethylene content in % by mole, at the point in the GPC chromatogram corresponding to the number average molecular weight, determined by GPC-FTIR, and $CM_w$ being the ethylene content in % by mole, at the point in the GPC chromatogram corresponding to the weight average molecular weight, determined by GPC-FTIR, or/ and a ratio $X_R$ of from 1.0 to 1.5, where $X_R=X_L/X_H$, $X_L$ being an average ethylene content of a lower molecular weight portion, determined by the GPC-FTIR, and $X_H$ being an average ethylene content of a residual higher molecular weight portion, determined by the GPC-FTIR, said lower molecular weight portion being the lower molecular portion of the GPC chromatogram occupying 30% of the total area of the chromatogram, said residual higher molecular weight portion being the higher molecular weight portion of the GPC chromatogram occupying the residual 70% of the total area of the chromatogram;

(B) a binder; and (C) a colorant.

2. The thermal fixing developer material for electrophotography according to claim 1 wherein said propylene-based copolymer wax (A) comprises a propylene-ethylene copolymer or a copolymer of propylene, ethylene, and a $C_{4-12}$ α-olefin.

3. A propylene-based copolymer wax wherein said propylene-based copolymer has a weight average molecular weight ($M_w$) determined by gel permeation chromatography (GPC) of from 3,000 to 50,000, a melting point determined by differential scanning calorimer (DSC) of from 120° C. to 140° C., and a propylene content of at least 90% by mole of propylene, and wherein said propylene-based copolymer has a compositional distribution $CM_n/CM_w$ determined by gel permeation chromatography-Fourier transform infrared spectroscopy (GPC-FTIR) of from 1.0 to 2.0, $CM_n$ being the ethylene content in % by mole, at the point in the GPC chromatogram corresponding to the number average molecular weight, determined by GPC-FTIR, and $CM_w$ being the ethylene content in % by mole, at the point in the GPC chromatogram corresponding to the weight average molecular weight, determined by GPC-FTIR, or/and a ratio $X_R$ of from 1.0 to 1.5, where $X_R=X_L/X_H$, $X_L$ being an average ethylene content of a lower molecular weight portion, determined by the GPC-FTIR, and $X_H$ being an average ethylene content of a residual higher molecular weight portion, determined by the GPC-FTIR, said lower molecular weight portion being the lower molecular portion of the GPC chromatogram occupying 30% of the total area of the chromatogram, said residual higher molecular weight portion being the higher molecular weight portion of the GPC chromatogram occupying the residual 70% of the total area of the chromatogram.

* * * * *